United States Patent
Stepan (10) Patent No.: US 6,561,061 B1
(45) Date of Patent: May 13, 2003

(54) DEVICE FOR STRIPPING WIRES OR CABLES

(75) Inventor: Jiri Stepan, Sargans (CH)

(73) Assignee: Schleuniger Holding AG, Thun (CH)

( * ) Notice: Subject to any disclaimer, the term of this patent is extended or adjusted under 35 U.S.C. 154(b) by 0 days.

(21) Appl. No.: 09/787,622

(22) PCT Filed: Sep. 7, 1999

(86) PCT No.: PCT/IB99/01515

§ 371 (c)(1),
(2), (4) Date: Mar. 20, 2001

(87) PCT Pub. No.: WO00/17976

PCT Pub. Date: Mar. 30, 2000

(30) Foreign Application Priority Data

Sep. 22, 1998 (CH) .................................. 2004/98

(51) Int. Cl.[7] ................................. H02G 1/12
(52) U.S. Cl. ......................... 81/9.51; 81/9.42
(58) Field of Search ............... 81/9.51, 9.41–9.44; 29/564.4; 30/90.1, 91.2

(56) References Cited

U.S. PATENT DOCUMENTS

| 3,838,612 A | * 10/1974 | Inami ........................ 81/9.51 |
| 3,853,156 A | * 12/1974 | Folkenroth et al. .......... 81/9.51 |
| 4,327,609 A | 5/1982 | Resch |
| 4,745,828 A | 5/1988 | Stepan |
| 4,838,129 A | * 6/1989 | Cope ........................... 81/9.51 |
| 4,920,830 A | 5/1990 | Stepan |
| 4,981,054 A | 1/1991 | Stepan |
| 5,111,720 A | 5/1992 | Stepan |
| 5,140,873 A | 8/1992 | Schwartzman |
| 5,243,882 A | 9/1993 | Stepan |
| 5,460,069 A | * 10/1995 | Sayyadi et al. .............. 81/9.51 |
| 6,330,839 B1 | * 12/2001 | Amrein ....................... 81/9.51 |

FOREIGN PATENT DOCUMENTS

| EP | 0 352 038 | 7/1989 |
| JP | 10-112913 A | 4/1998 |

* cited by examiner

*Primary Examiner*—D. S. Meislin
(74) *Attorney, Agent, or Firm*—Davis & Bujold, P.L.L.C.

(57) ABSTRACT

The present invention relates to a device for mechanically stripping the insulation of electrical and fiber-optic single- or multi-line conductors (26). The device comprises: an inlet opening for the conductor (26) or for a conductor end, a clamping device with at least one clamping jaw (6) and at least one knife (8) for cutting through an insulation around the conductor (26). An electric motor (25) drives a threaded spindle (21). This drives both clamping jaws (6) and knife (8) via couplings and control surfaces.

11 Claims, 4 Drawing Sheets

DEVICE FOR STRIPPING WIRES OR CABLES

FIELD OF THE INVENTION

The present invention relates to a device for mechanically stripping electrical and fiber-optic single- or multi-line conductors or wires and cables. The device comprises: an inlet opening for the conductor or for a conductor end, a clamping device having at least one clamping jaw and at least one knife for cutting through an insulation and a drive for radial incision and axial withdrawal of the knife.

BACKGROUND OF THE INVENTION

Stripping devices which use one pneumatic actuation cylinder each for the clamping jaws and knife actuation have been offered. These are bulky, which presents problems, for example, when processing complicated cable trees.

An early further development likewise comprised two cylinders. One cylinder served for driving the clamping jaws and for axial driving of the knives for the stripping movement. The second drive served for closing the knives. It travels concomitantly on a stripping carriage. This development was launched on the market by a predecessor of the Applicant, under the name AM2. In this design, a carefully thought out mechanism ensured that, when the stripping force was increased, the clamping force at the clamping jaws was automatically increased. This mechanism or its principle in particular was later also copied by others.

A stripping device further improved compared with the prior art described above was designed by the Applicant as early as 1982 and produced from 1986 onward and was launched on the market under the name US 2015. US 2500 and US 2045 are further developments of US 2015 by the Applicant.

These mechanical, pneumatic stripping devices now form the accepted prior art worldwide for small light stripping devices having non-rotating knives and are therefore frequently copied.

They have a high stripping force and cycle rate and are compact and convenient. They furthermore avoid the jamming of stripping residues by means of blowing out with air and drawing back of a conductor stop.

They have a single flying pneumatic cylinder which serves both as a drive for the knives and as a drive for the clamping jaws. The stripping axis (or stripping plane) in which the stripping forces act directly (this is parallel and, depending on the design and on the arrangement of the knife holders, parallel to the (US 2015) and sometimes virtually in the cable axis (US 2500)) is positioned adjacent to and parallel to a control axis (or control plane or control mechanism) around which axis (or in which plane or in which mechanism) is arranged a control rod which carries control elements for actuating the clamping jaws and knife jaws. The drive axis for applying the stripping and control forces (this is virtually the axis of the pneumatic cylinder) lies in the control axis. The result is therefore a specific construction length, since both drive elements and control elements are arranged along this drive axis. Since the drive axis and the stripping axis are parallel but do not coincide with one another, the result—depending on the stripping forces—is tilting moments which have to be absorbed by the bearing. However, the absorption of these tilting moments is associated with loss of drive energy.

A length adjustment stop for the conductor is drawn back during stripping of the insulation so that jamming cannot occur.

Disadvantageously, however, all these known devices require a pneumatic fluid and corresponding fluid feed means for operation. For example, in the DIY area and on building sites, this gives rise to problems (compressor for pneumatic fluid).

Attempts are being made worldwide to modify the design of a US 2015 or a comparable device in such a way that it is possible to dispense with the pneumatic fluid. Electrical drives have been used.

The A1 01 of Zollern+Fröhlich uses, as a drive principle, an electric motor which drives various cam disks for clamping, cutting into and stripping the insulation: Apart from a bulky design and complicated force transmissions, the stripping cycle in this machine is too slow compared with a US 2015. U.S. Pat. No. 4,327,609 also describes an embodiment having an electric motor and cam disks.

The W-2020 from Yoshiki likewise has an electrical drive motor and various transverse drive elements, which however make the design too bulky compared with a US 2500.

A more recent design of Cosmic KK, which is described in JP-10-112913 A, corresponds in the mechanical part to the mechanical design of US 2015, the pneumatic cylinder being replaced by a laterally located electric motor with spindle drive and gear. The abovementioned disadvantage of resultant tilting moments between drive axis and stripping axis was not avoided since, here too, the drive axis coincides with the control axis. In addition, it is substantially larger than the US 2015, but the stripping cycle is substantially slower owing to poor dynamics. A laterally located electric motor drives an axially floating spindle with a ballscrew nut by means of a toothed-belt gear and a spline shaft. Provided coaxially with the spindle are two conical surfaces as control surfaces for a clamping device and for a knife drive analogously to US 2015, which are thus driven as if by a piston rod with combs.

Apart from the poor compactness and slow stripping cycle, this known design thus furthermore has the disadvantage of relatively large, complicated control surfaces which, because drive axis and control axis coincide, include the spindles in them and must be mounted thereon, which can lead to additional frictional losses during the rotation of the spindle. Since the stripping setup (knives, knife jaws, feed pipes) which is arranged around the stripping axis and is axially displaceable by the spindle generates high axial forces, the relatively large distance between the stripping axis and the axis of the spindle results in the abovementioned relatively large tilting moments and therefore in further force losses and frictional losses. Further losses of axial shear force arise through friction in the spline shaft coupling.

The document EP-A-0352038 describes a device for stripping conductors along a stripping axis, comprising at least one each of an incision, stripping and control mechanism with at least one control element on the control mechanism. This known device is designed in such a way that the control mechanism is separated from the drive axis, and that the drive axis is parallel to the stripping axis. However, this design requires a separate drive for each axis, so that it is large and bulky and must have suitable electronics for coordinating the motors.

One of the objects of the present invention is thus to provide an improved stripping device whose construction length is shorter than a theoretical construction length in the case of structures having integrated drive axis and control axis. In a further step, this drive energy should be optimally utilized and hence above-mentioned losses very substantially avoided. Nevertheless, it should as far as possible be as compact as US 2015 or US 2500.

In a development step independent thereof per se, the pneumatic drive as known per se should be capable of being driven rotationally, in particular by means of electric energy, and the disadvantages mentioned in this context should be avoided.

The design should manage with a single drive motor, as in the case of said US machines.

SUMMARY OF THE INVENTION

According to the invention, the control mechanism of the drive axis is arranged separately. In this case, surprisingly, the construction length can be reduced by eliminating integration. The separation of the drive axis and control axis also results in a reduction in the construction length since only control elements, but no couplings or the like for the drive shaft (piston rod, spindle or the like) need be provided along the control axis.

An improved further development envisages that the drive axis is parallel between the stripping axis and the control mechanism. In the context of the invention, the control mechanism optionally also comprises a brake which assists with the control and accordingly can also generate tilting moments. Preferably, distances between drive axis and stripping axis and between drive axis and control axis are chosen so that any tilting moments between these axes build up symmetrically—but with opposite moment direction—around the drive axis, so that these tilting moments reduce one another and the corresponding loads on the bearings are reduced. This leads to the saving of drive energy; i.e. greater stripping forces can be applied with the same drive energy. However, this furthermore means that the stripping device can be designed as a whole to be smaller, which in many cases is a requirement of the users.

The "axes" mentioned in this Application are not necessarily axles in the mechanical engineering sense. Rather, they correspond to mathematical or spatial axes or directions or planes. They need not necessarily be absolutely linear and absolutely parallel. Rather, they have approximate relationships with one another which—comprehensible to those skilled in the art—are given by the teaching according to the invention with regard to shortening of design and torque compensation. The embodiments presented in the following description have, as a further axis, also a cable axis or a plane in which the cable lies. For the purposes of the invention, this axis or plane may be separated from the stripping axis or stripping plane or may coincide with it, as, for example, in the known model US 2500.

Since the stripping forces as a rule are larger than the control forces for clamping and/or cutting into a cable, the drive axis will in principle preferably be positioned in the vicinity of the stripping axis.

This effect according to the invention is independent of the choice of the drive motor. Instead of a pneumatic cylinder, linear electric motors or rotary motors having spindles may be used.

In an independent but preferred step, the known pneumatic cylinder is replaced by a rotary motor, preferably by an electric motor, whose drive shaft is connected by means of a coupling or by means of a force transmitter to a threaded spindle, which in turn moves control surfaces both for the clamping jaws and for the knife, a coupling being arranged between at least one of the driven components and the motor. This was unknown to date in the case of stripping machines having an electric motor.

An alternative development with axially displaceable mounting of the motor and a spindle device rigidly connected axially therewith has the advantage of being capable of being constructed even shorter, which might be an advantage for portable devices.

Known electrically actuatable stripping devices, such as, for example, the HC 207 (1985) of the Applicant (cf. U.S. Pat. No. 4,745,828), require separate drives for actuating the knife and the clamping device. There, the clamping device was actuated by an attracting magnet while knife jaws and centering jaws were driven by means of a spindle with conical control surfaces. A further drive rotates the knives additionally about the cable axis. A plurality of drives increase the construction volume on the one hand and the control costs on the other hand.

A coupling provided according to the invention and/or a corresponding force transmitter or the axial release of the motor, however, permits free running of any affected control surfaces, in order to be able to carry out various stripping steps or stripping movements, such as closing of clamping jaws and closing of knives and in particular the axial stripping, in succession. The simplest coupling used is a spline shaft on the motor output shaft with coupling sleeve on the spindle, or vice versa. An alternative to this would be to provide a carriage which carries the motor next to the spindle and the spline shaft, so that the spindle with the motor can move at any rate axially relative to the housing. In both cases, the spindle and the control surfaces are displaceable axially and relative to the housing.

A preferred further development envisages load-dependent control of the coupling. Such an automatic control is realized—optionally in a plurality of parts—for example—and in the manner known per se—by means of a spring and/or brake.

According to a preferred embodiment, the coupling comprises a threaded nut, in particular for friction-reducing reasons a ballscrew nut, which is driven by the threaded spindle. In embodiments with a continuous spindle, preferably all nuts running thereon are in the form of ballscrew nuts.

Within the scope of the invention, the spindle devices comprise various groups of spindles:

A) with a coupling to the motor;
    a spindle having a continuous thread, as known per se. In the case of the division according to the invention of the drive and control axes, it is advantageous compared with the prior art;
    a spindle having two thread sections (main and secondary thread sections) with different thread pitches permits actuation of the clamping jaws and stripping knife on the basis of force/speed division and moreover replaces a gear;

B) as for A), but the spindle is rigidly connected to the motor and in turn the motor is axially displaceable relative to the chassis, resulting in an even shorter design;

C) spindle connected to the motor via a spindle nut: A spindle having two separate thread sections with opposite thread directions with the same thread pitch leads to advantageous driving of the controlled components, particularly good utilization of the driving energy additionally being permitted in the case of different thread pitches;

D) a main spindle rigidly connected to the motor;
    a secondary spindle which is connected to the main spindle via a spindle nut optimizes the advantages of the latter design in that the smaller moment of inertia of a threaded spindle in a spindle nut has further advantages in terms of the dynamics All variations, with the exception of the first one under A), are by themselves novel and inventive in the application for stripping drives.

A stripping device which is thus special and has at least one clamping jaw and at least one stripping knife and has an electrical drive via a two-part threaded spindle.

As a particular advantage of the design, said design automatically adapts the clamping force in the entire stripping region, like the abovementioned pneumatic devices. Moreover, it has the advantage that, with an appropriate pitch design, it permits a different pitch and hence different forces and speeds for the different operations.

The invention relates to a preferred solution in which the spindle is divided into two, a main spindle and a secondary spindle, the two parts being connected to one another via a spindle nut. This replaces a spline shaft which is connected to the drive and also achieves undesirable frictional losses per se. The spindle nut arrangement results in particularly advantageous movement sequences: during start-up, there is immediately an axial thrust on the spindle nut, which thus exerts an axial thrust so that the required braking force for the movement sequence can be reduced.

The designs of the invention may be formed in contrast to a preferred division of the drive and control axes, but also according to the known design with coinciding control and drive axes, in which they still have advantages over the known one.

According to a particular embodiment of the invention, the motor is in the form of a coreless direct current motor. This accelerates the dynamics and the fast speed reversal which occurs in the course of an operating cycle.

A particularly further developed design, comprising an ejector, furthermore has the advantage of actively ejecting insulation residues. It is subjected to only little bending load, which increases its life. Preferably, that end of the ejector according to the invention which faces away from the knife runs at least partly concentrically around the rotary shaft coordinated in each case with the respective knife jaw. The invention also covers a preferred further development of the ejectors.

A preferred device uses a direct current motor whose reversal of the direction of rotation is triggered by electrical position sensors. Preferably, the output shaft and the spindle are aligned because this minimizes the construction width of the stripping device. An electronic control can be arranged below or above the motor without increasing the construction width. According to a particular embodiment of the electronics, these can—as known per se in the case of continuous cable processing machines (e.g. CS 9100 of the Applicant)—take place automatically according to a program, in order to strip different cable dimensions in succession. Any possibilities for setting dimensions would also be automated for such a design.

The device according to the invention is thus also suitable for a portable hand-held device which can be optimally used in particular also for cable tree processing.

In addition to the preferred electric motors, fluidic rotary motors or other rotary drives can also alternatively be used.

BRIEF DESCRIPTION OF THE DRAWINGS

The invention is to be explained in more detail by way of example with reference to an embodiment. In addition to the list of reference numerals, the technical descriptive parts of the patent claims are also an integral part of the description.

DESCRIPTION OF PREFERRED EMBODIMENTS

The Figures are described in association with one another and overall. Identical parts bear identical reference numerals and functionally similar parts bear identical reference numerals with different indices.

Figure 1:
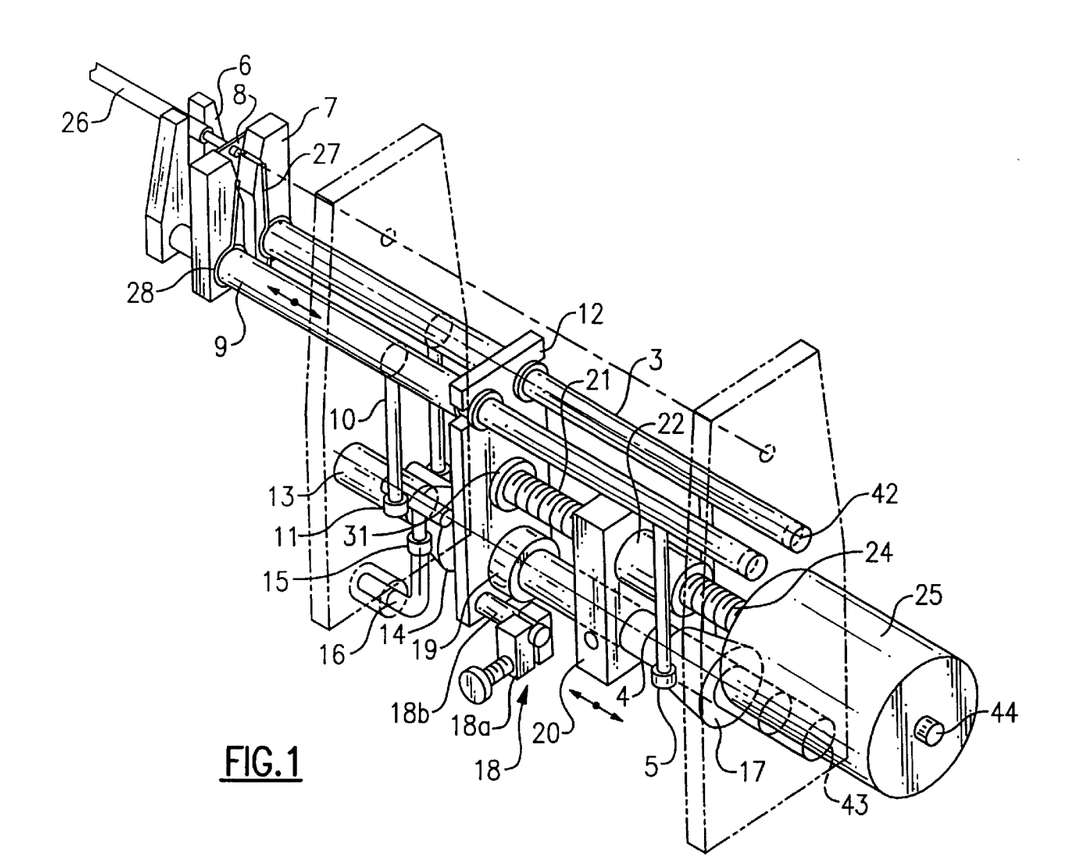
FIG. 1 shows a preferred device according to the invention.

The device according to FIG. 1 comprises a motor 25 (preferably a coreless direct current motor) having a secondary spindle 24 with a coarse thread which, together with a spindle nut 22, forms a connection to the drive of the main spindle 21. The spindle nut 22 is rigidly connected to the main spindle 21 and can be screwed onto the secondary spindle 24. However, it is mounted so as to be rotatable in a thrust plate 20 but axially fixed.

With the further elements, the functional sequence is described below:

In the starting position, clamping jaws 6 and knife holders 7 are open as a rule and side by side (top left in the Figure).

After the starting pulse, the motor begins to accelerate the secondary spindle 24. Since this as well as the coreless motor has a small moment of inertia, this initially takes place virtually without resistance. Owing to the coarse thread and the inertia of the nut 22 and spindle 21, the result is an axial force on the spindle nut 22, which is transmitted via the thrust plate 20 to a conical shaft 13 since this is firmly connected axially to the thrust plate 20. At the same time, the main spindle 21 attempts, by means of its thread inclined to the opposite sense, to pull a thrust plate 12 in which it is rotatably held by means of an inner thread (preferably a ballscrew nut), backward. The thrust plate 12 is however held nondisplaceably relative to the housing by means of a brake 18 so that it initially remains at rest axially.

A knife cone 14 is mounted on the shaft 13 by means of a pressure spring 38 (FIG. 5a) and spreads expanding axles 10 by means of T-levers 16 and thus rotates thrust sleeves 9 which carry knife jaws 7.

Figure 5A:
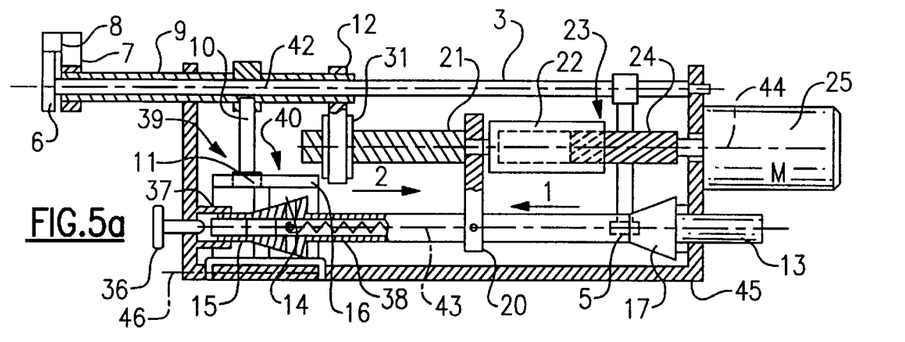
FIGS. 5a–5c shows design variants having different spindle versions.

The T-levers 16 advantageously ensure that the spreading always takes place uniformly regardless of an axial relative position of the thrust sleeves 9, which position can be preset by a setscrew 36 via a conical thrust pin 37 (FIG. 5a). Friction-reducing duplicating rollers 11 and 15 transmit the expansion movement.

Figure 6:
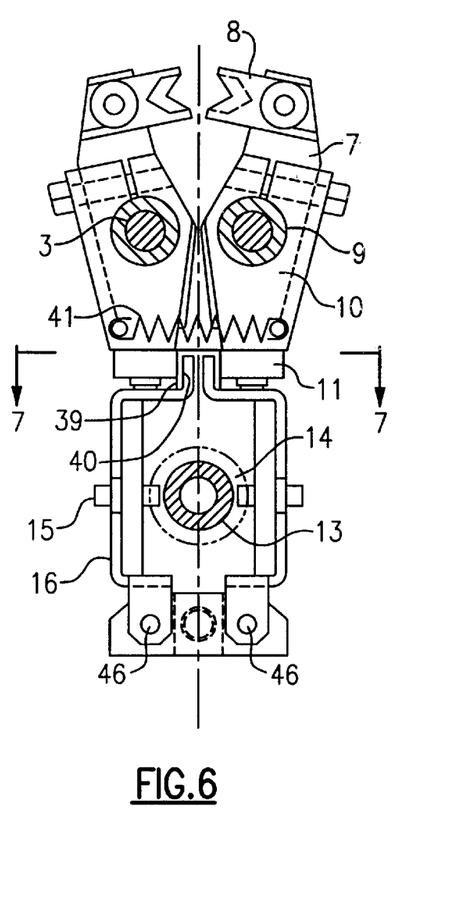
FIG. 6 shows a section through a design comprising a preferred knife actuation surface.
Figure 7:
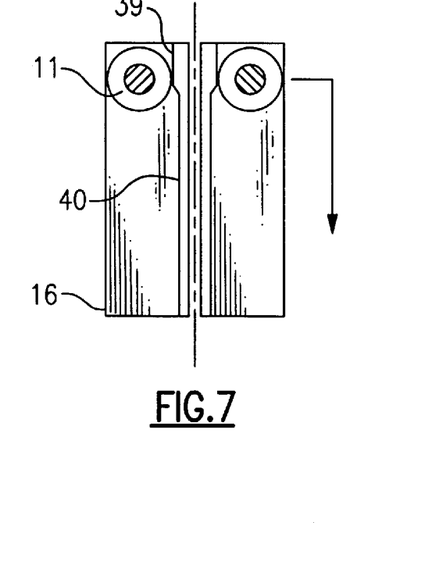
FIG. 7 shows a plan view of the actuation surface.

According to a particular embodiment of the invention, which should also be capable of being used independently also in the case of machines from the prior art, the roller paths for the duplicating rollers 11 on the T-levers 16 are provided with steps so that first and second path sections (39, 40) result (FIGS. 6, 7). The first path sections 39 separate the duplicating rollers 11 to a greater extent than the second path sections 40. Accordingly, the first path sections 39 spread the expanding levers 10 to a greater extent than the second path sections 40. The knives 8 cut in more deeply. In the position of the second path sections 40, the knives 8 are thus once again drawn slightly apart, which corresponds to a "setback" and—as known per se—corresponds to protection of the conductor to be stripped. The "setback" comes into force after a short stripping section and thus after the insulation piece to be stripped has already been safely cut through.

The depth of the incision is limited by the setscrew 36. The knife cone 14 driven by a spring 38 is stopped by the setscrew 36. The diameter is thus determined and the spring may be further compressed, with the result that the clamping cone 17 further closes the clamping jaws 6 via the parts 3, 4, 5.

The magnitude of the "setback" is defined by the dimensional difference between the two path sections 39 and 40. This can, if required, also be wedge-shaped or have a plurality of path sections.

Clamping jaws 6 which are held on rotary shafts 3 close simultaneously with the incision. For this purpose, the rotary shafts 3 are driven by clamping cone 17 via expanding axles 4. In this preferred embodiment, there is a difference with respect to the knife cone 14 in that the clamping cone 17 is connected axially rigidly to the conical shaft 13. Alternatively, it too could be capable of being actuated by means of a pretensioned—optionally adjustable—pressure spring. This would allow a certain elasticity in the clamping range of the clamping jaws 6.

An automatic adaptation of the clamping force of the clamping jaws 6 as a function of the stripping forces to the thrust plate 12 is obtained as follows: spindle 21 pulls the plates 12 and 20 toward one another. Consequently, the conical shaft 13 and hence the clamping cone 17 are forced between the rollers 5 and expanding axles 4. The greater the tensile force on the spindle 21, the greater the pressure on the cone 17.

The feed is supported by the screwing of the main spindle 21 into the firmly held thrust plate 12. In this embodiment, high start-up and acceleration forces are thus of particular effect according to the invention. This effect is then achieved also on rotation of the motor in the opposite direction, in which the sequences take place in the opposite direction.

As soon as the clamping jaws 6 rest radially against a conductor 26, the axial forces on the rotary shaft 3 increase. After a braking force defined by adjustment of the brake jaws 18a has been reached, said braking force is overcome. The stripping of the insulation now begins in that the main spindle 21 pulls the thrust plate 12 and hence the knife holders 7 backward while overcoming the braking force. Since the main spindle is equipped with a relatively fine thread pitch, there are no force problems here.

The coarse thread on the secondary spindle 24 results in a particularly advantageous force transmission in the axial direction of the plate 20 and hence to the conical shaft 13. The braking force of the brake 18 is reduced by at least this force component—compared with the known one. Another result of this is that to a high degree the same stripping performances can be achieved with smaller moments of inertia, which also has positive effects on the operating speed and the machine size and machine dynamics. Experiments show that, with identical drive power, this design can achieve up to about twice the stripping speeds compared with the design having only one simple drive spindle.

The combination of the different thread pitches and the direct driving of the spindle by the motor output shaft additionally result in a positive transmission ratio, so that additional gears can be dispensed with.

Figure 2:
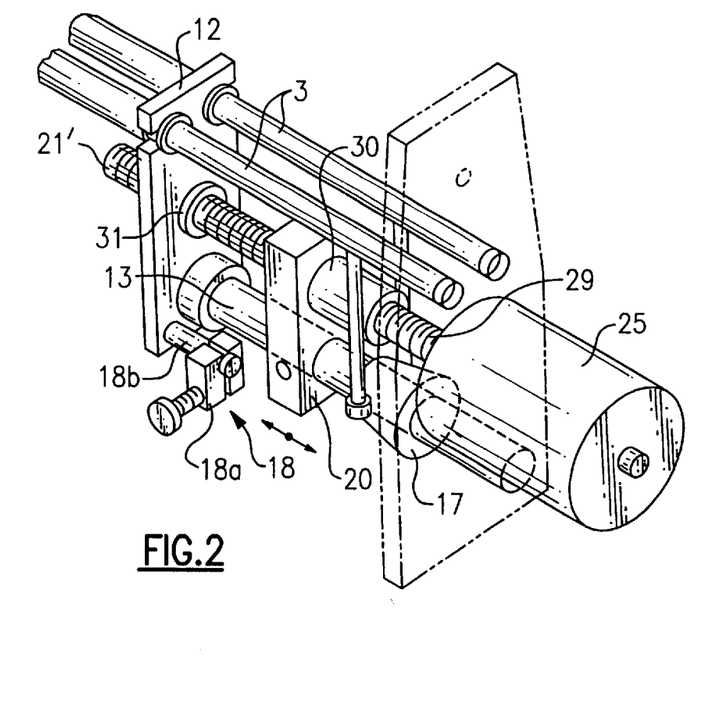
FIG. 2 shows a device in which only the drive of the clamping jaws is shown.

The device according to FIG. 2 does not go into detail about the drive of the clamping jaws since these are arranged in a manner known per se or according to the measures as shown in FIG. 1 on the front free end of the main spindle 21. Instead of a two-part drive spindle having two different thread sections, there is in this embodiment a main spindle 21' having a relatively gentle thread and, between the motor 25 and this thread 21', a spline shaft coupling 29 or 30 known per se. This can alternatively also be arranged conversely, for example according to FIG. 5b, the motor output shaft being coordinated, because of the smaller start-up torque, preferably with the smaller external diameter of the spline shaft 29 rather than with the larger external diameter of the coupling sleeve 30. The section has a longitudinal groove guide 29a.

As in FIG. 1, a brake 18 with its brake shoes 18a is connected nondisplaceably with respect to the housing in the axial direction. If the drive force between the main spindle 21 and the nut 31 coordinated with it in the thrust plate 12 falls below the braking force, the thrust plate 12 can remain stationary to the housing, i.e. the main spindle 21 screws into the nut 31 and thus takes with it the thrust plate 20 and the conical shaft 13, analogously to FIG. 1.

On reaching the stop 36 (FIG. 5a), the knife feed is stopped by axial fixing of the position of the knife cone 14. Further displacement of the conical shaft 13 now only serves to increase the tension on the feed of the clamping jaws. This clamping cone, too, could if required be spring-loaded. However, as soon as both cones 14 and 17 and hence the conical shaft 13 can no longer move, the braking force on the brake rod 18b is overcome and the thrust plate 12 is drawn backward by the main spindle 21 and thus takes the rotary shafts 3 to the stripping position of the knives, as shown, for example, in FIG. 1.

After stripping is complete, the direction of rotation is reversed. Owing to the braking force of the brake 18, the thrust plate 12 comes to a stop again. The thrust plate 20 is thus pushed backward as a result of the backward travel of the main spindle 21, until the clamping cone 17 comes up against a stop (position in FIG. 5a). This contact leads to axial fixing of the thrust plate 20, as a result of which the nut 31 and with it the thrust plate 12 and hence the opened knife holders 17 are once again pushed forward toward the opened clamping jaws 6. On reaching the initial cutting position, the drive is stopped and the device is ready for reversing the direction of rotation for a new stripping cycle.

Accordingly, the axial freedom of the spline shaft 29 is important for this design.

The more strongly the brake 18 is applied, the steeper the slope of the clamping force characteristic (clamping force curve). On the other hand, an increase in the braking force is disadvantageous during feeding/advancing. This design is therefore not preferred over the design according to FIG. 1. This can lead to lower stripping speeds and poor dynamics. This is incidentally also the disadvantage of known pneumatic arrangements, where, owing to better dynamics and improved force conditions, stronger braking forces would not be so troublesome.

Figure 3:
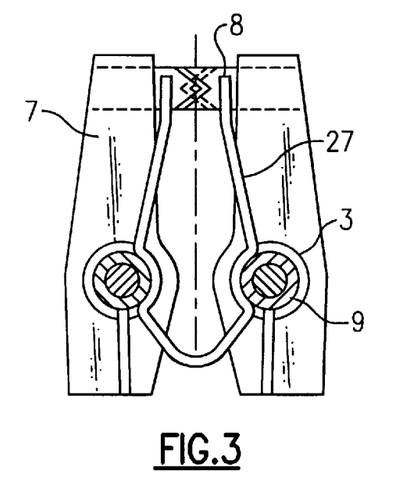
FIGS. 3–4 shows a detail of a knife holder according to the invention, having spring ejectors.
Figure 4:
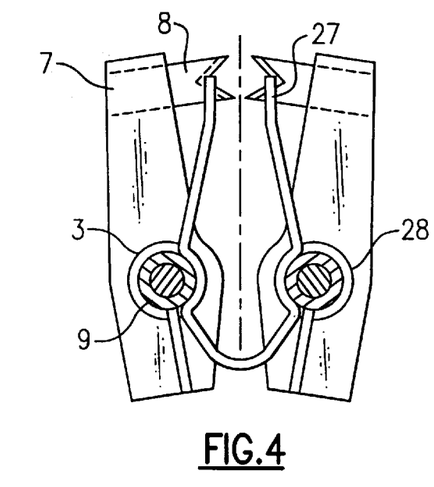

The design according to FIGS. 3 and 4 makes it possible optimally to remove stripping residues from the stripping knife in stripping machines without a compressed air connection. This simple solution prevents an effect on the stripping quality, by virtue of the fact that the ejectors 27 are removed from the cutting points at the moment of cutting.

The distance between the two ejector parts is virtually independent of the rotational position of the thrust sleeves 9, i.e. independent of the position of the knives 8. The ejectors can therefore be set up in such a way that they always eject as soon as the knives 8 open and have reached a certain open position but, on closing of the knives, do not project beyond the cutting edge and therefore reach the insulating sheath surface only after the knife edges. In addition, they can be changed without the use of tools since, owing to their shape, they are merely clamped between the thrust sleeves 9. This shape is also advantageous with respect to the spring properties. The designs of FIGS. 5a–5c show the principle of various spindle embodiments according to the invention.

FIG. 5a shows the design according to FIG. 1, the design of the knife cone 14 being shown in detail. This design gives very high dynamics with very small required braking forces and, associated with this, very good adaptation of the clamping forces and a very low energy requirement. Secondary spindle 24 and spindle nut 22 could also be interchanged, but this permitted poorer dynamics.

Figure 5B:
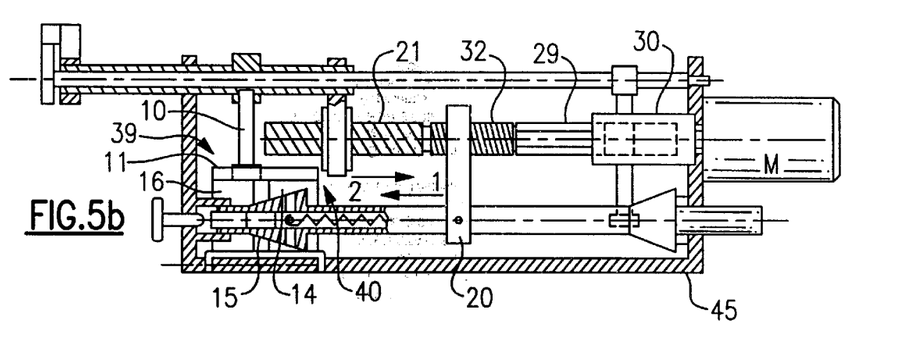

FIG. 5b shows a modified design according to FIG. 2 with a spindle having two thread sections 21 and 32 which have identical thread direction but different pitch. The ratio of the product of force times speed for the thrust plate 20 on the one hand and the thrust plate 12 on the other hand is determined by the ratio of the thread pitches. This is therefore a simple solution with gear action. Here, the spline shaft 29 and the coupling 30 are interchanged compared with the variant according to FIG. 2, which slightly reduces the dynamics.

Figure 5C:
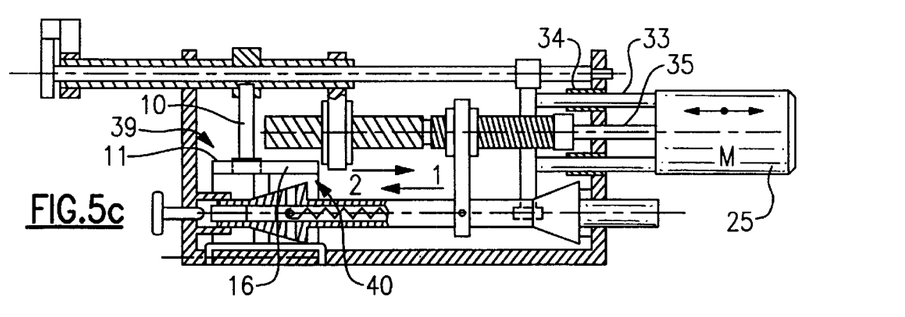
Figure 5D:
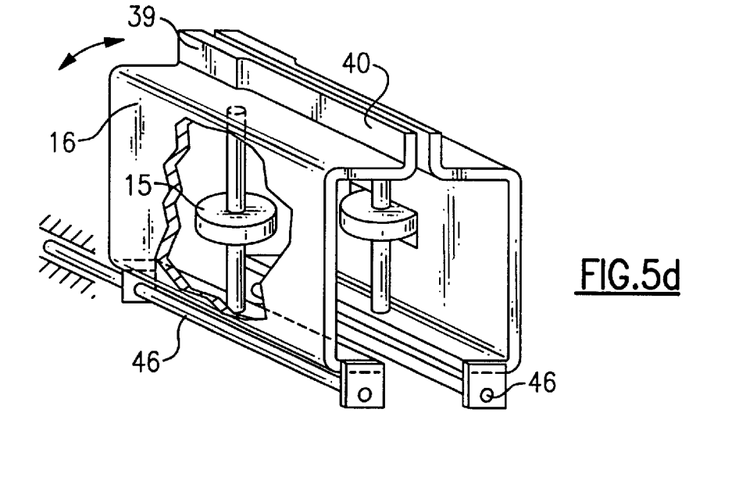
FIG. 5d is a perspective view of the T-levers 16 as also shown in following FIGS. 6 and 7.

FIG. 5c shows the particularly short design according to the principle of FIG. 2 or FIG. 5b, but with an axially displaceable motor 25 on thrust rods 33 and thrust bearings 34, which further shortens the design.

All three variants exhibit a preferred division, according to the invention, of the drive axis 44 and control axis 43 in relation to the stripping axis 42.

FIGS. 6 and 7 illustrate the "setback" according to the invention with the aid of the path sections 39 and 40 on the T-levers 16 which are shown only schematically as round levers in FIG. 1 but which in practice are preferably plate-like. They swivel about pivot axles 46 in a chassis 45.

List of Reference Numerals

1 Front plate
2 Motor plate
3 Rotary shaft
4 Expanding axles
5 Rollers for clamping procedure
6 Clamping jaws
7 Knife holder
8 (Stripping) knife
9 Thrust sleeve
10 Expanding axles
11 Duplicating roller
12 Thrust plate with internal thread, acts as nut
13 Conical shaft
14 Knife cone
15 Duplicating roller
16 T-lever
17 Clamping cone
18 Brake
18a Brake shoes
18b Brake rod
19 Longitudinal guide
20 Thrust plate
21 Main spindle, spindle section having a normal thread
22 Steep-threaded nut, spindle nut
23 Force transmitter, a combination of steep-threaded spindle and nut which is firmly connected to the main spindle 21, also resulting in an advantageous transmission of the motor speed.
24 Secondary spindle, steep-threaded spindle, spindle section having a steep thread.
25 Drive motor
26 Conductor
27 Ejector
28 Incision
29 Spline shaft (section on the spindle)
30 Free axial coupling for spline shaft
31 Nut in thrust plate 12
32 Spindle section (secondary spindle section) having a smaller slope but identical thread direction
33 Motor guide
34 Sliding bearing
35 Motor axis
36 Setscrew, stop for diameter (knife cut depth)
37 Conical thrust pin
38 Pressure spring
39 First path section
40 Second path section for setback
41 Tension spring
42 Stripping axis
43 Control mechanism, shown schematically as control axis or control plane but, within the scope of the invention, is not restricted to the linear form shown
44 Drive axis
45 Chassis
46 Pivot axle for T-lever 16

What is claimed is:

1. A device for stripping insulation from an electrical conductor or a fiber optic conductor (26), the device comprising;
    a cutter for radially cutting and axially, stripping the insulation from the conductor along a stripping axis;
    a cutting and stripping control mechanism defining a control axis for controlling the cutter;
    a drive motor operating the cutting and stripping control mechanism and the cutter via a spindle aligned along a drive axis (44); and
    wherein the control axis and the drive axis are separate from and parallel with one another and the stripping axis is parallel with the drive axis.

2. The device according to claim 1 wherein the cutting and stripping control mechanism comprises an axially moveable stripping coupler driven by the drive motor and connecting the cutting and stripping control mechanism and a cutting knife of the cutter aligned along the stripping axis.

3. The device according to claim 2 wherein the stripping coupler is mounted on a threaded drive spindle connected to the drive motor along the drive axis to facilitate axial movement of the stripping coupler relative to the drive motor.

4. The device according to claim 3, wherein the threaded drive spindle is spaced from and symmetrically disposed between the stripping axis (42) and the control axis to balance any moments developed at the control and stripping axes about the drive axis (44) during operation of the stripping device.

5. The device as set forth in claim 4 further comprising an axially stationary clamping jaw (6) for radially gripping and aligning the insulated conductor along the stripping axis, and wherein the cutting knife (8) is axially spaced from the clamping jaw along the stripping axis for radially cutting into the insulation surrounding the conductor (26) and axially stripping the insulation from the conductor.

6. The device according to claim 5 wherein the drive motor is a single rotary drive electric motor (25) connected to the threaded drive spindle to drive both the cutting knife (8) and the clamping jaws (6).

7. The device according to claim 3, wherein the threaded spindle is one of a single spindle provided with two thread sections (21, 24, 32) having different thread pitches, and a separate main spindle (21) and a secondary spindle (24) each provided with different thread pitches.

8. A device for stripping insulation from an electrical conductor or a fiber optic conductor (26), the device comprising;
- a cutter for radially cutting and axially stripping the insulation from a conductor along a stripping axis;
- a cutting and stripping control mechanism defined about a control axis for controlling the cutter;
- a drive motor operating the cutting and stripping control mechanism and the cutter via a spindle aligned along a drive axis (44); and
- wherein the stripping axis, the control axis and the drive axis are separate from and parallel with one another and the cutting and stripping control mechanism includes a radial cutter control providing the cutter with a first cutting depth deeper than a subsequent stripping depth.

9. A device for stripping insulation from an electrical conductor or a fiber optic conductor (26), the device comprising;
- a gripper for radially grasping and aligning the electrical conductor along a stripping axis;
- a cutter and stripper for radially cutting and axially stripping the insulation from a conductor along the stripping axis;
- a cutting and stripping control mechanism having a separate axially spaced cutter control surface defined about a control axis for separately controlling a radial cutting depth of the cutter, and a cutter control surface follower directly connected with and controlling the radial cutting depth of the cutter corresponding to the cutter control surface;
- a drive motor operating the cutting and stripping control mechanism and the cutter via a spindle aligned along a drive axis (44); and
- wherein the stripping axis, the control axis and the drive axis are separate from and parallel with one another and the cutter control surface follower has a contiguous first and second step providing the cutter and stripper with a first cutting depth deeper than a subsequent stripping depth.

10. The device according to claim 9 wherein the spindle comprises a first threaded section having a first thread pitch controllably supporting a cutter and stripper control and a second threaded section having a second thread pitch controllably supporting a gripper control to separately and proportionally control the cutter and stripper in cooperation with the gripper.

11. The device according to claim 10 wherein the first and second threaded sections are separate and connected by a spindle nut.

* * * * *